May 28, 1935.  A. G. McGUIRE  2,003,088
SEMIAUTOMATIC TRANSMISSION
Filed Dec. 18, 1933   2 Sheets-Sheet 1

INVENTOR.
A. G. McGUIRE
BY
M. Talbert Dick
ATTORNEY.

May 28, 1935.  A. G. McGUIRE  2,003,088
SEMIAUTOMATIC TRANSMISSION
Filed Dec. 18, 1933  2 Sheets-Sheet 2
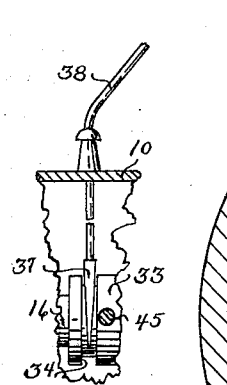
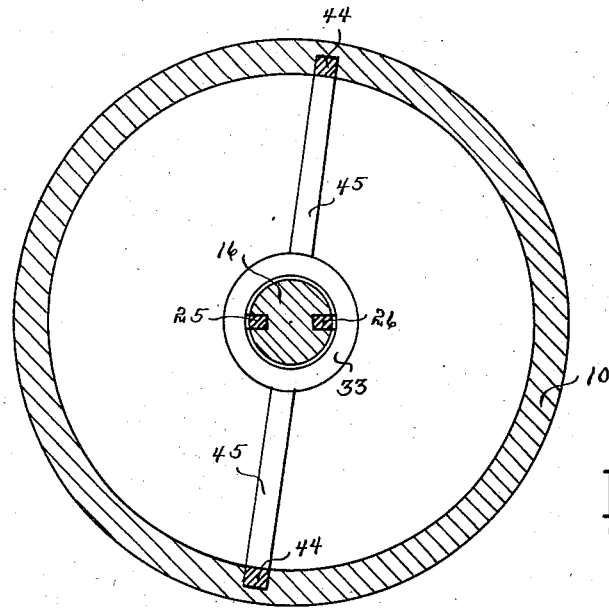
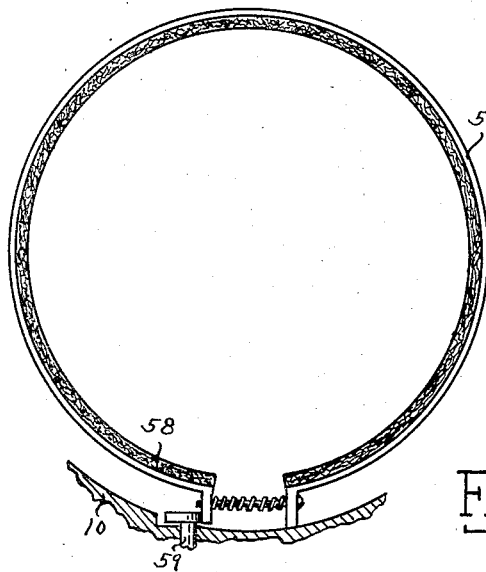
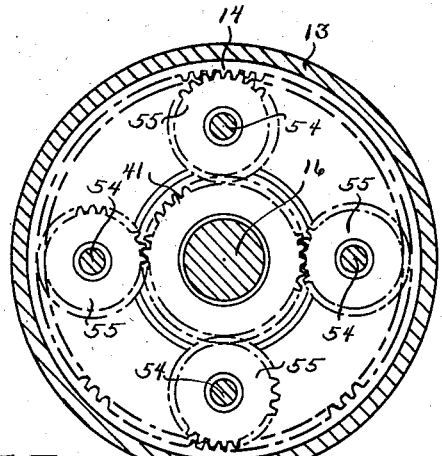
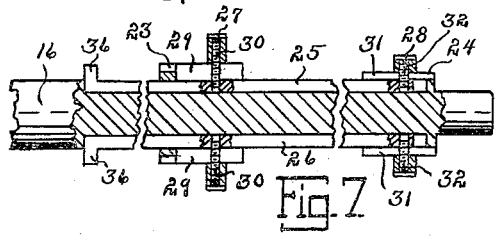
INVENTOR.
A. G. McGUIRE
BY
M. Talbert Dick
ATTORNEY.

Patented May 28, 1935

2,003,088

UNITED STATES PATENT OFFICE 2,003,088

SEMIAUTOMATIC TRANSMISSION

Archie G. McGuire, Fort Dodge, Iowa

Application December 18, 1933, Serial No. 702,952

10 Claims. (Cl. 74—260)

This invention relates to transmissions for automotive vehicles or the like and has for its principal object a transmission that will automatically go into higher gears from low gear when a predetermined speed or load pull is attained and will automatically return to a lower gear when the speed or load pull drops to a speed or load pull below the predetermined speed or load pull of the higher gear.

A further object of my invention is to provide a semi-automatic transmission that may be manually set to provide a super high.

A still further object of this invention is to provide a transmission that makes it unnecessary to disengage the clutch when the transmission goes from a low gear to a higher gear or from a higher gear to a lower gear.

A still further object of this invention is to provide a semi-automatic transmission that delivers a uniform uninterrupted power while the transmission is progressing from a low gear to a higher gear or from a higher gear to a lower gear.

A still further object of my invention is to provide a semi-automatic transmission that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 4 is a cross-sectional view of the device taken on line 4—4 of Fig. 1.

Fig. 5 is an end view of a breaking element used in the transmission.

Fig. 6 is a cross-sectional view of a portion of the transmission taken on line 6—6 of Fig. 1.

Fig. 7 is a side view of the motor-driven shaft and certain elements thereon with sections cut away to more fully illustrate their constructions.

Fig. 8 is a side view of one of the control mechanisms of the transmission.

Although my transmission may be used in any machinery where a transmission is desirable it is particularly designed for use on automotive vehicles such as automobiles, trucks, airplanes, and the like. Transmissions now being used for these purposes by the general public require the manual operation of the transmission for the obtaining of different gear ratios. Furthermore, during the shifting of the gears the clutch must be disengaged, which means that no power is being transmitted to the traction wheels from the motor during the time the clutch is disengaged and the gears are being shifted.

In other words, the rolling momentum of the vehicle must be depended upon during the shifting of the gears. In hilly country and in congested traffic such transmissions are highly objectionable and it is to overcome such objections that I have produced my semi-automatic transmission, which I will now describe.

Figure 1:
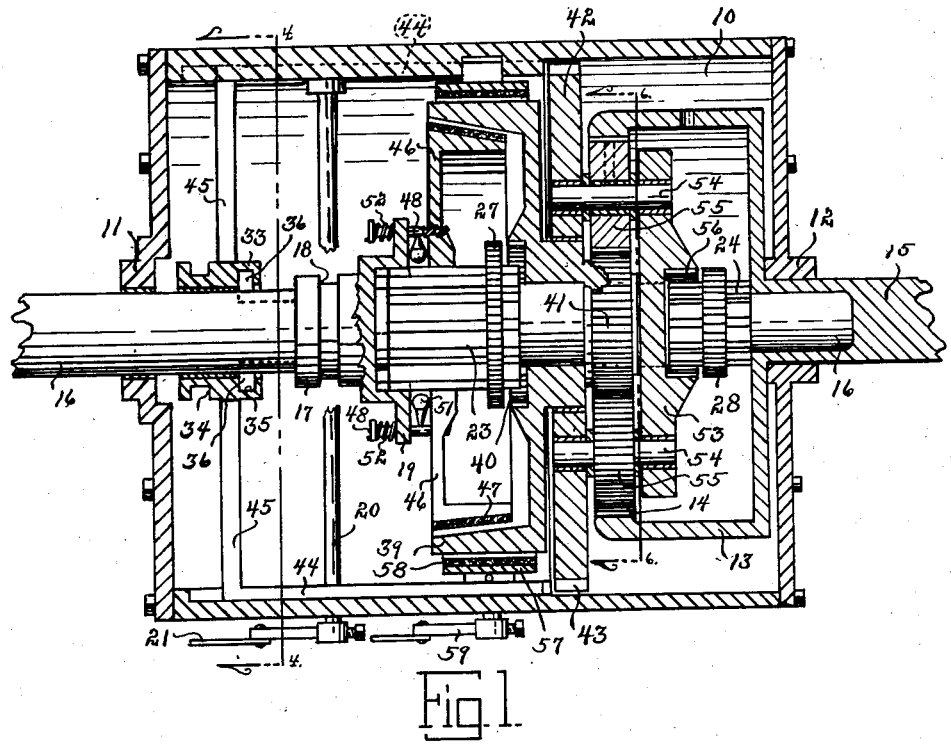
Fig. 1 is a side-sectional view of my transmission ready for use and in neutral.

Referring to the drawings, I have used the numeral 10 to designate the transmission housing and in which is the usual lubricating oil. On the front end of the transmission housing is a bearing member 11. A similar bearing member 12 is located at the rear end of the housing. The numeral 13 designates a cup member having internal gear teeth 14. This cup member is located in the rear portion of the transmission housing and has in its center a shaft 15 journaled in the bearing member 12 and extending out of the rear end of the housing. This shaft 15 is the transmission driven shaft and is designed to be operatively secured to the elements at point of power use, such as traction wheels or like. The numeral 16 designates the motor-driven shaft designed to be in operative engagement with a prime mover. This motor shaft is journaled in the bearing member 11, extends the full length of the inside of the transmission housing and has its rear end loosely journaled in the bottom of the cup member and forward end of the shaft 15 as shown in Fig. 1.

The numeral 17 designates a control sleeve loosely and slidably mounted on the shaft 16. This member 17 has a continuous groove 18 and a peripheral flange portion 19. The numeral 20 designates a control shaft extending transversely into the transmission housing and positioned above the member 17. This shaft 20 is rotatably mounted and has secured to it a manually controlled lever 21 for the manual rotation of the same.

Figure 3:
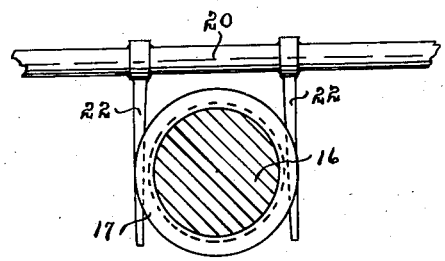
Fig. 3 is a cross-sectional view of the motor-driven shaft and control sleeve thereon.

The numeral 22 designates two spaced apart fingers rigidly secured to the shaft 20. These fingers extend downwardly and engage the groove 18 at each side of the member 17, as shown in Fig. 3. By this construction, when the lever 21 is operated the shaft 20 will be rotated and the control sleeve will thereby be slid forwardly or rearwardly on the shaft 16. The numeral 23 designates an elongated splined portion rigidly formed on the shaft 16 and positioned to the rear of the member 17. The numeral 24 designates a second splined portion rigidly formed on the shaft 16. This splined portion 24 is positioned near the rear end of the transmission housing. The numerals 25 and 26 designate two key members slidably resting in two grooves in the shaft 16 respectively at points diametrically opposite from each other. These keys 25 and 26 extend longitudinally of the shaft 16, are flush with the periphery of the shaft and progress inside the member 17 and the two splined portions 23 and 24. The numeral 27 designates an external clutch surrounding and slidably mounted on the splined portion 23. The numeral 28 designates an external clutch surrounding and slidably mounted on the splined portion 24. The numeral 29 designates longitudinal slots in the splined portion 23. The numeral 30 designates set screws secured to the external clutch 27 extending through the slots 29 and threaded into the keys 25 and 26, as shown in Fig. 7. The numeral 31 designates longitudinal slots in the splined portion 24. The numeral 32 designates set screws secured to the external clutch 28, extending through the slots 31 and threaded into the keys 25 and 26, as shown in Fig. 7. By this arrangement of parts when the keys 25 and 26 are slid to the rear the external clutches 27 and 28 will be slid to the rear on the splined portions 23 and 24 and when the keys 25 and 26 are slid forwardly the external clutches 27 and 28 will also be moved forwardly.

As the external clutches 27 and 28 are slidably secured to the splined portions 23 and 24 and are rigidly secured to the keys 25 and 26, when the shaft 16 is rotated the splined portions 23 and 24 and the external clutches 27 and 28 will be rotated with the shaft 16. The numeral 33 designates a collar loosely and slidably mounted on the shaft 16 and positioned in the inside forward end portion of the transmission housing. This collar has an external circular groove 34 and an internal circular groove 35. The numeral 36 designates a lug on the forward end portion of each of the keys 25 and 26 extending into and engaging the internal circular groove 35, as shown in Fig. 1. The numeral 37 designates a member riding in the external groove 34. The numeral 38 designates a manual control lever for moving the member 37 forwardly and rearwardly to slide the member 33 forwardly and rearwardly on the shaft 16. The numeral 39 designates a cup member rotatably mounted on the shaft 16 and positioned between the splined portions 23 and 24. This cup member 39 faces the forward end of the transmission housing and has the inner surface of its circular side well tapering inwardly as it progresses to the rear, as shown in Fig. 1. The numeral 40 designates an internal clutch in the bottom of the cup member 39. This internal clutch 40 has a diameter much less than the diameter of the cup member and is designed to be engaged by the external toothed clutch 27 at times. The numeral 41 designates an external toothed gear embracing the shaft 16 and rigidly secured on the rear bottom of the cup member 39. The numeral 42 designates a plate member rotatably mounted on the rear bottom end of the cup member 39 and positioned in a plane forward of the gear 41. This plate 42 has teeth 43 on its periphery. The numeral 44 designates two key members slidably mounted in grooves in the inner wall of the transmission housing. These slidably mounted keys 44 are positioned at points diametrically opposite from each other and are capable of being slid to the rear to engage the teeth 43 of the plate 42.

Figure 2:
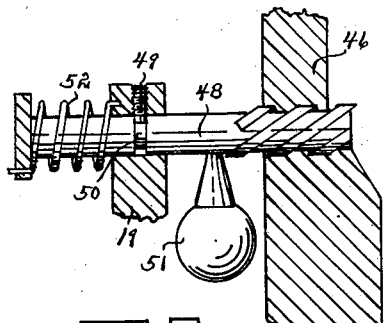
Fig. 2 is an enlarged top-sectional view of a portion of the governor mechanism.

The numeral 45 designates arms connecting the keys 44 rigidly to the member 33. The numeral 46 designates an internal cup member slidably embracing the splined portion 23. This internal cup member has the outer face of its circular side wall tapering inwardly as it progresses to the rear and conforms with the general outline of the inside surface of the circular wall of the external cup member 39. The numeral 47 designates a brake band of suitable resilient material on the outside of the circular wall portion of the internal cup member 46. The numeral 48 designates a plurality of small shafts rotatably mounted in the flange 19 and having their forward ends threaded into the internal cup member 46. These shafts 48 are prevented from sliding movement relative to the flange 19 by cap screws 49 threaded into the flange and engaging peripheral grooves 50 in the shafts 48 respectively, as shown in Fig. 2. The numeral 51 designates a counter balance weight secured to each of the shafts 48. These counter balance weights 51 normally extend toward a common center, as shown in Fig. 1. This normal position of the weights 51 is yieldingly maintained by a coil spring 52 embracing each of the shafts 48, having one end secured to the shaft it embraces and its other end secured to the flange 19, as shown in Fig. 2. By this arrangement the rapid rotation of the member 17 and internal cup member 46, both of which slidably engage the splined gear 23 as shown in Fig. 1, will cause the weights 51 to move and extend outwardly by centrifugal force and against the action of the springs 52. With the movement of the weights 51 to outwardly extending positions, the shafts 48 will be rotated, which will force the internal cup member 46 away from the member 17 and into engagement with the external cup member 39.

The numeral 53 designates a plate member rotatably mounted on the shaft 16 and positioned to the rear of the external gear 41. The numeral 54 designates a plurality of shafts extending between and journaled in the plates 42 and 53. The numeral 55 designates an external gear rotatably mounted on each of the shafts 54. Each of these external gears 55 mesh with the external gear 41 and the internal gear teeth 14 of the cup member 13, as shown in Fig. 1. The numeral 56 designates internal clutch teeth formed on the rear central portion of the plate 53, which are designed to be engaged by the external clutch 28 at times. The numeral 57 designates a brake band embracing the outer circular side wall of the cup member 39. This brake band is lined with suitable resilient braking material 58. The numeral 59 designates a hand lever for manually tightening the brake band 57 onto the cup member 39.

The practical operation of the device is as follows. By the use of the hand lever 38 the member 33 is forced forwardly, thereby moving the external clutch 28 into engagement with the teeth of the plate 53. With the plates 53 and 42 rotating with the motor-driven shaft 16 the small external gears 55 will move in a circle around the external gear 41 and inside the teeth 14 of the cup member 13. As the external gear 41 has a diameter much less than the diameter of the cup member 13 either the gear 41 or cup member 13 must rotate to make up the difference in the gear ratio. With the cup member 13 operatively secured to the traction wheels of the vehicle or like its tendency will be to remain stationary, thereby increasing the rotation of the gear 41 greater than the rotation of the motor-driven shaft 16. However, with the shaft 16 rotating the weights 51 will be thrown out by centrifugal force, which will force the internal cup member 46 to the rear and in engagement with the cup member 39.

As the internal cup member 46 is rotating with and at the same speed as the motor-driven shaft 16 the tendency will be to slow the external cup member 39 down, thereby decreasing the rapid rotation of the external gear 41 and causing the shaft 15 to rotate accordingly and relative to the amount the external cup member 39 was slowed down. This rotation of the shaft 15 will be in low gear. With the increasing speed of rotation of the shaft 16 and the lack of load pull on the traction wheels the internal cup member 46 will rigidly attach itself to the external cup member 39, thereby locking the external gear 41 against independent rotation relative to the motor-driven shaft 16. When this takes place the cup member 13 will rotate directly with the motor-driven shaft 16 and high gear will result. From the foregoing it will be seen that after the transmission was manually placed in low gear it automatically progressed to a higher gear. With the reduction of the speed of rotation of the shaft 16 the springs 52 will tend to move the weights 51 toward their normal positions, thereby semi-releasing the internal cup member 46 from the external cup member 39 and automatically returning the transmission from a higher gear to a lower gear.

In some instances a super high gear may be desired. When this is the case the hand lever 21 is operated to slide the member 17 forwardly, it will disengage the internal cup member 46 with the external cup member 39. At this moment the hand lever 59 is operated to tighten the brake band on the external cup member 39, thereby rigidly holding it against any rotation. With the cup member 39 held stationary the difference in gear ratio must be made up by the cup member 13 rotating at a relatively greater speed than the motor-driven shaft 16, thereby producing a super high speed.

To obtain a reverse gear it is merely necessary to operate the hand lever 38 to move the member 33 to the rear. This movement of the member 33 to the rear will place the external clutch 27 into engagement with the internal clutch 40 and the keys 44 into locking engagement with the teeth 43 of the plate 42. With the plates 42 and 53 held against rotation and the gear 41 locked with the shaft 16 the small gears 55 will not race around a common center, but will remain in a stationary position and be rotated by the gear 41. As the gear 41 will be rotating to the right with the shaft 16 the cup member 13 will be rotated in low gear to the left, thereby resulting in reverse gear. A reverse gear can also be obtained by eliminating the external gear 27 and merely locking the plate 42 against rotation by the keys 44. In this case the weights 51 are relied upon to move the internal cup member 46 into engagement with the external cup member 39.

From the foregoing it will be seen that I have provided a highly desirable semi-automatic transmission.

Some changes may be made in the construction and arrangement of my improved semi-automatic transmission without departing from the real spirit and purpose of my invention, and it is my intention to cover by my claims any modified forms of structure or use of mechanical equivalents which may be reasonably included within their scope.

I claim:

1. In a device of the class described, a shaft designed to be operatively secured to a prime mover, a second shaft, an internal ring gear secured to said second shaft, a plate member rotatably mounted on said first shaft, an external gear rotatably mounted on said first shaft, an external gear rotatably mounted on said plate and engaging the said first-mentioned external gear and the said internal ring gear, a clutch mechanism secured to said first-mentioned external gear, governor mechanism operatively secured to said first shaft and said clutch mechanism for engaging and disengaging said clutch mechanism, an internal clutch secured to said plate, and an external clutch operatively secured to said first shaft capable of being manually placed in engagement with the internal clutch on said plate.

2. In a device of the class described, a housing, a shaft journaled in said housing designed to be operatively secured to a prime mover, a second shaft journaled in said housing, an internal ring gear secured to said second shaft, a plate rotatably mounted in said housing, an external gear rotatably mounted in said housing, a second external gear rotatably mounted on said plate in engagement with said first-mentioned external gear and said internal gear, a clutch mechanism inside said housing operatively secured to said first-mentioned external gear, a governor mechanism operatively secured to said first shaft and said clutch mechanism for operating said clutch mechanism, an internal clutch secured to said plate, and an external clutch operatively secured to said first shaft and capable of engaging said last-mentioned internal clutch at times.

3. In a device of the class described, a housing, a shaft journaled in said housing designed to be operatively secured to a prime mover, a second shaft journaled in said housing, an internal ring gear secured to said second shaft, a plate rotatably mounted in said housing, an external gear rotatably mounted in said housing, a plurality of external gears rotatably mounted on said plate and in engagement with said first-mentioned external gear and said internal gear, a clutch mechanism inside said housing operatively secured to said first-mentioned external gear, a governor mechanism operatively secured to said first shaft and said clutch mechanism for operating said clutch mechanism, an internal clutch secured to said plate, and an external clutch operatively secured to said first shaft and capable of engaging said last-mentioned internal clutch at times.

4. In a device of the class described, a housing, a shaft designed to be operatively secured to a prime mover journaled in said housing, a second shaft journaled in said housing, an internal ring gear secured to said second shaft, a plate rotatably mounted in said housing, a toothed gear rotatably mounted in said housing, a toothed gear rotatably mounted on said plate in engagement with said toothed gear and said internal gear at points diametrically opposite from each other, a clutch mechanism inside said housing operatively connected to said toothed gear, a governor mechanism inside said housing operatively connected to said first shaft and said clutch mechanism for actuating said clutch mechanism, a clutch secured to said plate, a clutch operatively secured to said first shaft capable of being manually placed in engagement with said last-mentioned clutch, and a manual means for locking said toothed gear against rotation at times.

5. In a device of the class described, a housing, a shaft designed to be operatively secured to a prime mover journaled in said housing, a second shaft journaled in said housing, an internal ring gear secured to said second shaft, a plate rotatably mounted in said housing, a toothed gear rotatably mounted in said housing, a toothed gear rotatably mounted on said plate in engagement with said toothed gear and said internal gear at points diametrically opposite from each other, a clutch mechanism inside said housing operatively connected to said toothed gear, a governor mechanism inside said housing operatively connected to said first shaft and said clutch mechanism for actuating said clutch mechanism, a clutch secured to said plate, a clutch operatively secured to said first shaft capable of being manually placed in engagement with said last-mentioned clutch, a manual means for disengaging said clutch, and a manual means for locking said toothed gear against rotation.

6. In a device of the class described, a housing, a shaft journaled in said housing designed to be operatively connected to a prime mover, a second shaft rotatably mounted in said housing, an internal ring gear secured to said second shaft, a plate rotatably mounted in said housing, a toothed gear rotatably mounted in said housing, a gear rotatably mounted on said plate in engagement with said toothed gear and said internal ring gear, a clutch mechanism inside said housing operatively connected to said toothed gear, a governor mechanism inside said housing operatively connected to said first shaft and said clutch mechanism for actuating said clutch mechanism, a manually operated means for placing said clutch mechanism in engagement at times, an internal clutch secured to said plate, and a toothed clutch secured to said first shaft capable of being manually placed in engagement with said last-mentioned internal clutch.

7. In a device of the class described, a housing, a shaft journaled in said housing designed to be operatively connected to a prime mover, a second shaft in said housing, an internal gear secured to said second shaft, a plate rotatably mounted in said housing, a second plate rotatably mounted in said housing, a plurality of shafts extending between and secured to said first and second plates, an external gear rotatably mounted on each of said shafts in engagement with said internal ring gear, a toothed gear rotatably mounted in said housing in engagement with each of said external gears rotatably mounted on the shafts extending between said two plate members, an internal clutch secured to said first-mentioned plate, an external clutch operatively connected to said first shaft capable of being manually placed in engagement with said last-mentioned internal clutch, a clutch mechanism inside said housing operatively secured to said toothed gear, a governor mechanism inside said housing operatively connected to said first shaft and said clutch mechanism, and a manual means for locking said plates against rotation and operatively connecting said toothed gear to said first shaft at times.

8. In a device of the class described, a housing, a shaft journaled in said housing designed to be operatively connected to a prime mover, a second shaft in said housing, an internal gear secured to said second shaft, a plate rotatably mounted in said housing, a second plate rotatably mounted in said housing, a plurality of shafts extending between and secured to said first and second plates, an external gear rotatably mounted on each of said shafts in engagement with said internal ring gear, a toothed gear rotatably mounted in said housing in engagement with each of said external gears rotatably mounted on the shafts extending between said two plate members, an internal clutch secured to said first-mentioned plate, an external clutch operatively connected to said first shaft capable of being manually placed in engagement with said last-mentioned internal clutch, a cup member rotatably mounted in said housing rigidly secured to said toothed gear, an internal cup member operatively secured to said first shaft extending into said first cup member and capable of frictionally engaging said first cup member when moved in one direction, and a governor mechanism inside said housing operatively connected to said first shaft for reciprocating said internal cup member.

9. In a device of the class described, a housing, a shaft journaled in said housing designed to be operatively connected to a prime mover, a second shaft in said housing, an internal gear secured to said second shaft, a plate rotatably mounted in said housing, a second plate rotatably mounted in said housing, a plurality of shafts extending between and secured to said first and second plates, an external gear rotatably mounted on each of said shafts in engagement with said internal ring gear, a toothed gear rotatably mounted in said housing in engagement with each of said external gears rotatably mounted on the shafts extending between said two plate members, an internal clutch secured to said first-mentioned plate, an external clutch operatively connected to said first shaft capable of being manually placed in engagement with said last-mentioned internal clutch, a cup member rotatably mounted in said housing rigidly secured to said toothed gear, an internal cup member operatively secured to said first shaft extending into said first cup member and capable of frictionally engaging said first cup member when moved in one direction, a governor mechanism inside said housing operatively connected to said first shaft for reciprocating said internal cup member, an internal clutch secured to said first-mentioned cup member, an external clutch operatively secured to said first shaft capable of being manually moved into engagement with said last-mentioned internal clutch, and a manual means for locking said plates against rotation.

10. In a device of the class described, a housing, a shaft journaled in said housing designed to be operatively secured to a prime mover, a second shaft journaled in said housing, a plate rotatably mounted in said housing, a clutch on said plate, a clutch operatively secured to said first shaft and capable of being manually moved into engagement with said plate clutch, a second internal ring gear secured to said second shaft, a toothed gear rotatably mounted in said housing, an external gear rotatably mounted to said plate in engagement with said last-mentioned internal ring gear and said toothed gear, a cup member rigidly secured to said toothed gear having the inner surface of its circular side wall tapering inwardly as it progresses toward the bottom of the cup member, an internal cup member operatively secured to said first shaft having the outer surface of its circular side wall tapering inwardly as it extends away from its bottom, and a governor mechanism operatively secured to said first shaft and said internal cup member for moving said internal cup member into engagement with said external cup member.

ARCHIE G. McGUIRE.